United States Patent
Lilien

(10) Patent No.: US 12,216,965 B2
(45) Date of Patent: Feb. 4, 2025

(54) TECHNOLOGIES FOR COLLECTING AND VIRTUALLY SIMULATING CIRCADIAN LIGHTING DATA ASSOCIATED WITH A PHYSICAL SPACE

(71) Applicant: UL LLC, Northbrook, IL (US)

(72) Inventor: Adam Lilien, Syracuse, NY (US)

(73) Assignee: UL LLC, Northbrook, IL (US)

( * ) Notice: Subject to any disclaimer, the term of this patent is extended or adjusted under 35 U.S.C. 154(b) by 906 days.

(21) Appl. No.: 17/199,697

(22) Filed: Mar. 12, 2021

(65) Prior Publication Data

US 2021/0286913 A1    Sep. 16, 2021

Related U.S. Application Data

(60) Provisional application No. 62/988,776, filed on Mar. 12, 2020.

(51) Int. Cl.
*G06F 30/13* (2020.01)
*H05B 47/11* (2020.01)
(Continued)

(52) U.S. Cl.
CPC ............. *G06F 30/13* (2020.01); *H05B 47/11* (2020.01); *H05B 47/125* (2020.01); *G06F 2111/18* (2020.01)

(58) Field of Classification Search
CPC ...... G06F 30/13; G06F 2111/18; G06F 30/12; H05B 47/11; H05B 47/125; Y02B 20/40; G06Q 10/10; G06Q 50/08; G06Q 50/06
(Continued)

(56) References Cited

U.S. PATENT DOCUMENTS

| 9,763,306 B2 | 9/2017 | Sachs et al. |
| 9,955,551 B2 | 4/2018 | Spero |

(Continued)

FOREIGN PATENT DOCUMENTS

| CN | 110274602 A | * | 3/2018 | ............. G01C 21/03 |
| CN | 108181636 B | * | 6/2018 | ............. G01C 17/00 |

(Continued)

OTHER PUBLICATIONS

International Application No. PCT/US2021/022047, International Search Report and Written Opinion, mailed Jul. 1, 2021.
(Continued)

*Primary Examiner* — Juan C Ochoa
(74) *Attorney, Agent, or Firm* — MARSHALL, GERSTEIN & BORUN LLP

(57) ABSTRACT

Systems and methods for collecting and analyzing lighting conditions associated with a physical space in order to effect circadian-effective design. According to certain aspects, a data capture machine may include various sensors and components, such as at least one image sensor that captures digital images of a set of luminaires, at least one laser that detects physical objects as well as the location of the data capture machine in the physical space, a detector that collects a set of spectral power distribution (SPD) measurements, and a video capture device that collects images at a set of locations of the physical space. The data capture machine may aggregate the captured information and generate an electronic file that a computing device may use to present a visual representation of the lighting conditions of the physical space.

16 Claims, 7 Drawing Sheets

(51) Int. Cl.
*H05B 47/125* (2020.01)
*G06F 111/18* (2020.01)

(58) Field of Classification Search
USPC .......................................................... 703/1, 13
See application file for complete search history.

(56) References Cited

U.S. PATENT DOCUMENTS

| | | | |
|---|---|---|---|
| 10,489,968 | B1 | 11/2019 | Livingston et al. |
| 10,681,792 | B2* | 6/2020 | Hu .......................... H05B 47/19 |
| D892,655 | S | 8/2020 | Green et al. |
| 2006/0085170 | A1* | 4/2006 | Glaser ..................... G06F 30/20 |
| | | | 703/1 |
| 2017/0257925 | A1 | 9/2017 | Forbis et al. |
| 2018/0043130 | A1* | 2/2018 | Moore-Ede ............ H05B 47/16 |
| 2018/0252374 | A1 | 9/2018 | Keller et al. |
| 2018/0339127 | A1 | 11/2018 | Van Reen et al. |
| 2019/0136618 | A1 | 5/2019 | Hebeisen et al. |
| 2019/0209858 | A1* | 7/2019 | Slaughter ............. A61N 5/0613 |
| 2021/0157958 | A1* | 5/2021 | Hegazy ................... G06T 7/337 |
| 2023/0367033 | A1* | 11/2023 | Mitterhofer ............. G01W 1/00 |

FOREIGN PATENT DOCUMENTS

| | | | |
|---|---|---|---|
| EP | 2807526 | A1 | 12/2014 |
| EP | 3113055 | A1 | 1/2017 |
| JP | 2016136495 | A | 7/2016 |
| JP | 201966056 | A | 4/2019 |
| KR | 101792493 | B1 | 11/2017 |
| KR | 10-2019-0142095 | A | 12/2019 |
| KR | 20190142095 | A * | 12/2019 ........ H04M 1/72415 |
| WO | WO-2019084392 | A1 | 5/2019 |

OTHER PUBLICATIONS automation.omron.com—LD Series Autonomous Mobile Robots, Omron Corporation 2021 Retrieved from internet on Jun. 18, 2021: https://automation.omron.com/en/us/products/family/Id.

Konis, A novel circadian daylight metric for building design and evaluation, Building and Environment, 113:22-38 (2016).

Knoop et al., Methods to describe and measure lighting conditions in experiments on non-image-forming aspects, Leukos: The Journal of the Illuminating Engineering Society of North America, 15(2-3):163-79 (May 2019).

European Patent Application No. 21768618.7, Extended European Search Report, dated Apr. 4, 2024.

* cited by examiner

TECHNOLOGIES FOR COLLECTING AND VIRTUALLY SIMULATING CIRCADIAN LIGHTING DATA ASSOCIATED WITH A PHYSICAL SPACE

CROSS-REFERENCE TO RELATED APPLICATIONS

This application claims priority benefit to U.S. Patent Application No. 62/988,776, filed Mar. 12, 2020, which is hereby expressly incorporated by reference in its entirety.

FIELD

The present disclosure is directed to collecting and simulating indoor lighting data associated with a physical space. More particularly, the present disclosure is directed to platforms and technologies for generating a virtual representation of a physical space indicating lighting conditions of the virtual space and enabling individuals to modify components that affect the lighting conditions.

BACKGROUND

A circadian rhythm is a natural, internal process that regulates the sleep-wake cycle and repeats roughly every twenty-four (24) hours according to the sun and moon cycle, where human physio-biology has evolved based on this twenty-four (24) hour cycle. Research has shown that without access to bright sunlight during the day, an individual's internal clock will "wander," which can diminish sleep quality, decrease alertness, and increase rates of diabetes and depression, among other negative effects. Recently, there have been efforts to mimic the circadian cycle in indoor environments through electrical lighting and use of windows and skylights. In general, the lighting industry describes the basic design goal to achieve circadian entrainment as: "more light during the day, and less light during the night." Of particular importance, the impact of more or less lighting during particular times of the day is said to influence the "non-visual" aspects of illuminating a space. One commonly known model of calculating the impact of ambient sunlight and artificial electric lighting in an indoor space is called Circadian Stimulus (CS). In the CS model, the lighting levels that enter the eyes is measured on the vertical plane. Lighting designers and specifiers are well versed in delivering illumination for the visual impacts, such as the amount of illumination hitting a horizonal surface, as in a desk. As the lighting industry prepares to add and/or alter procedures to deliver effective CS designs, some light sources (e.g., light fixtures) may incorporate LED technology and controls that may vary the intensity and temperature of the emitted light to mimic a natural circadian cycle. One such procedure was published by UL, LLC in 2019 titled: UL DG 24480 for Promoting Circadian Entrainment with Light for Day-Active People.

However, lighting specifiers and designers of indoor environments are only beginning to account for emitted light from a plurality of luminaires and ambient light from windows and skylights and how well this light aligns with a circadian cycle. Indeed, research indicates that current average indoor lighting levels are consistently low such that individuals' circadian cycles are negatively impacted.

Through research, it is widely accepted that different wavelengths of illumination have differing efficacies in stimulating the circadian system. These wavelengths and their energy levels as a collection are known as the spectral power distribution (SPD) of the fixture. As the illumination of a light source is reflected off of objects in the space, the SPD is altered by the color of the object, further impacting the efficacy in stimulating the circadian system. As the science and practices of lighting designers evolves, more sophisticated accounting is needed to address the spectral shift that occurs when a light source (such as a luminaire/lamp, a window, or a skylight) is reflected by a surface (such as a wall, floor, and ceiling) with its own spectral characteristics, such as color and/or reflectance.

Accordingly, there are opportunities for systems and methods to compile data that is used to understanding an impact of lighting conditions on the human circadian system within a physical space, comparing that data to a goal, and visually rendering the lighting conditions in, for example, a Computer Aided Design (CAD) program to enable an individual to assess and determine how to improve the lighting conditions, and facilitate those improvements.

SUMMARY

In an embodiment, a computer-implemented method for detecting lighting conditions within a physical space is provided. The method may include: collecting, by a data capture machine, a set of lighting measurements respectively at a set of locations of the physical space; associating, by a processor, the set of lighting measurements with the set of locations at which the set of lighting measurements was collected; and generating, by the processor using the set of lighting measurements associated with the set of locations, an electronic file comprising data indicating a set of light sources located within the physical space.

In another embodiment, a device for detecting lighting conditions within a physical space is provided. The device may include: at least one image sensor configured to capture a set of digital images depicting a set of luminaires within the physical space; at least one laser configured to capture a set of readings associated with the physical space; a detector configured to collect a set of spectral power distribution (SPD) measurements respectively at a set of locations of the physical space; and a processor interfacing with the at least one image sensor, the at least one laser, and the detector. The processor may be configured to: generate, using the set of digital images captured by the at least one image sensor, a reflected ceiling plan indicating the set of luminaires within the physical space, generate, using the set of readings captured by the at least one laser, a floorplan of the physical space, and generate, using the reflected ceiling plan and the floorplan, an electronic file associated with the physical space, the electronic file indicating the set of SPD measurements associated with the set of locations of the physical space.

In another embodiment, a non-transitory computer-readable storage medium configured to store instructions may be provided. The instructions when executed by a processor may cause the processor to perform operations comprising: collecting a set of video image data and a set of lighting measurements respectively at a set of locations of a physical space; associating the set of video image data with the set of locations; generating, using the set of video image data and the set of lighting measurements associated with the set of locations, an electronic file comprising data indicating a circadian contribution of each source of illumination located within the physical space; generating a visual representation of the physical space, wherein the visual representation indicates the circadian contribution of each source of illumination; and enabling a user to view, via a user interface, the visual representation in a virtual reality (VR) or augmented reality (AR) format.

In another embodiment, a transitory or non-transitory CS measuring device that may be worn or permanently installed in the space may be provided. The device may be enabled with an Internet of Things (IoT) connection to the cloud, and may be configured to periodically send a CS measurement (e.g., every 5 seconds) to a central server. The system enables a dashboard indicating the floor layout, the location of the CS measuring device, and the readings. The system may report the total CS of the space, and whether the goals of certain standards (e.g., UL 24480) have been met. Where deficiencies are noted, the report may inform the lighting controls to extend the duration of time of artificial light to reach the goal.

DETAILED DESCRIPTION

The present embodiments may relate to, inter alia, platforms and technologies for capturing lighting condition data associated with a physical space. According to certain aspects, the systems and methods may incorporate a data capture machine that may be configured with various sensors and data capture components. In particular, the data capture machine may be configured with a laser, an image sensor, an SPD detector, and/or other components. Generally, the laser may be configured to read and record aspects of the physical space, the image sensor may be configured to capture a set of images of a set of luminaires (and in some cases, windows, skylights, and/or other light sources) present in the physical space, and the SPD detector may capture SPD values at various locations of the physical space.

According to embodiments, a computing device may aggregate and compile the captured data, and generate an electronic file based on the aggregated and compiled data. A user may access the electronic file via any computing device and/or software application, and may review and assess the lighting conditions of the physical space, such as in a design phase associated with the physical space. If desired, the user may modify a lighting plan for the physical space by adding and/or relocating luminaires. For example, the compiled data may indicate that a specific area of the physical space may lack adequate lighting, and the user may use the computing device to add a luminaire to that specific area so that the specific area achieves a lighting condition goal.

The systems and methods offer numerous benefits. In particular, the combination of the data that is captured provides an accurate and comprehensive assessment of lighting conditions at various locations throughout a physical space. Thus, a user (e.g., a lighting designer or other individual) may review the data combination to assess areas having lighting conditions that do not meet certain goals or thresholds. The user is able to virtually correct the lighting conditions in these areas, which may be completed at the design phase prior to construction of the physical space or otherwise prior to installation of the lighting system in the physical space. Thus, the physical space will more easily and effectively achieve lighting conditions that are suitable and that align with certain circadian goals. Additionally, developers or other individuals may experience reduced costs associated with the lighting system as a result of fewer modifications post-installation. It should be appreciated that additional benefits are envisioned.

Figure 1:
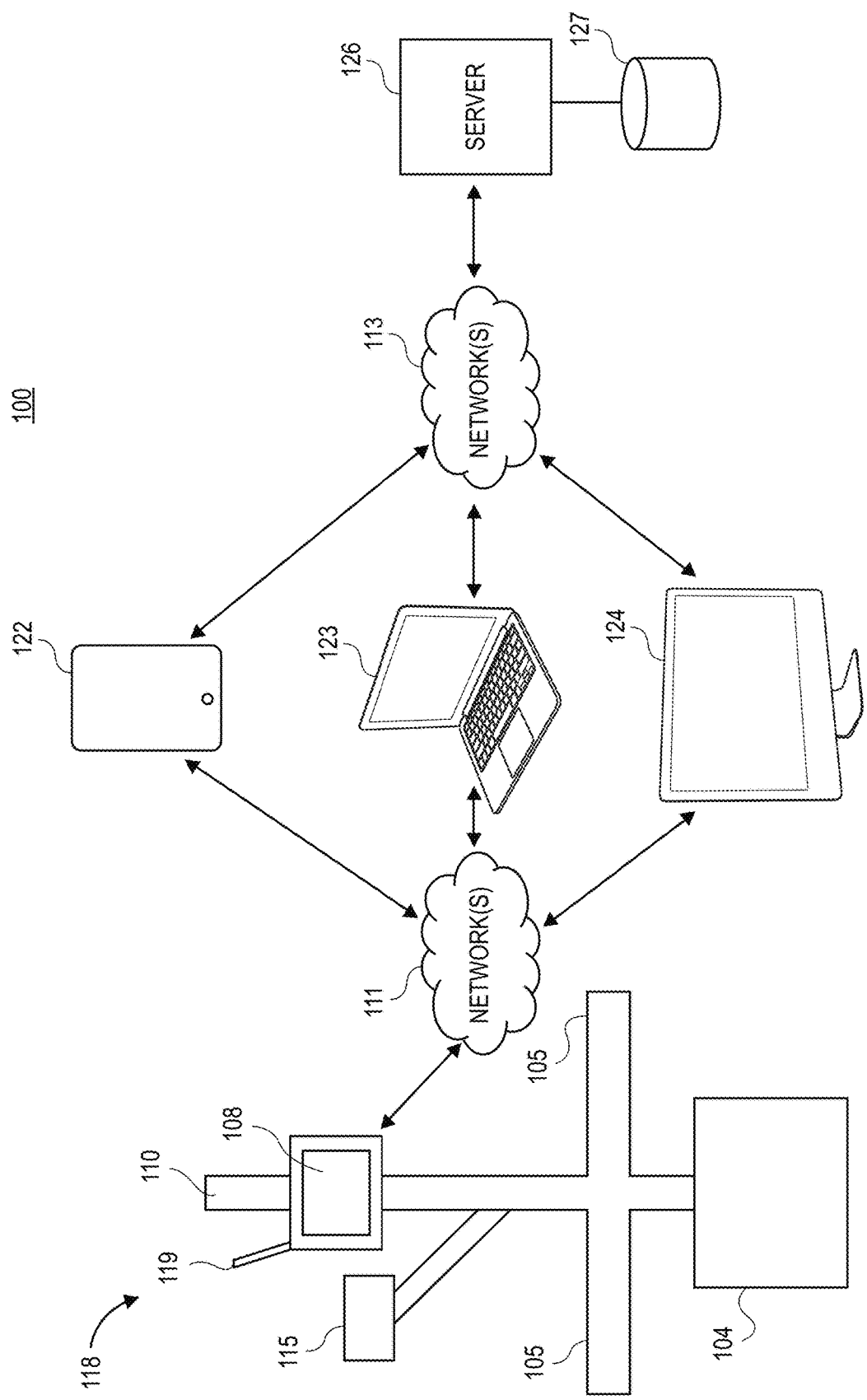
FIG. 1 depicts an overview of components and entities associated with the systems and methods, in accordance with some embodiments.

FIG. 1 illustrates an overview of a system 100 of components configured to facilitate the systems and methods. It should be appreciated that the system 100 is merely an example and that alternative or additional components are envisioned.

As illustrated in FIG. 1, the system 100 may include a data capture machine 118 configured with a set of components that may capture various data and information associated with a physical space. According to embodiments, the data capture machine 118 may be, in some forms, embodied as a robot configured to traverse through the physical space, such as on one or more predefined or improvised paths, using a set of travel components 104 (e.g., gears, wheels, belts, etc.) that enables movement of the data capture machine 118. The data capture machine 118 and components thereof may be operated and/or controllable by an individual, manually, or via a wired or wireless connection, and/or may operate autonomously.

The data capture machine 118 may include a user interface 108 that may be embodied as part of a computing device. According to embodiments, the computing device may include a processor configured to analyze data collected or captured by components of the data capture machine 118. The user interface 108 may be configured to display or present information associated with the captured data, and/ or with operation of the data capture machine 118 (e.g., to enable an individual to operate the data capture machine 118). The computing device may comprise various communication components, including an antenna(s) 119, that may be configured to transmit and receive various data from various components or entities via one or more wired or wireless connections.

The data capture machine 118 may include an image sensor(s) 110 configured to capture a set of digital images that may depict a set of luminaires or lighting fixtures installed or disposed within the physical space. For example, the set of digital images may depict a set of luminaires installed across a set of locations of the ceiling of the physical space. According to embodiments, the image sensor(s) may alternatively or additionally capture digital video that depicts the set of luminaires or lighting fixtures.

The data capture machine 118 may further include a set of lasers and/or sonar devices 105 configured to scan for physical objects located within the physical space. According to embodiments, the data captured by the set of lasers 105 may indicate a presence of various physical objects (e.g., cubicles, filing cabinets, shelving units) located within a vicinity of the data capture machine 118. The output of such laser(s) 105 may be a point cloud that represents the physical space where the measurements are taken. Generally, the data capture machine 118 and components thereof may detect and record its location within the physical space, relative to a zero point on an "X/Y" axis. This location data and any other captured data may be time stamped, enabling a correlation between the data captured and the location where it was captured, as well as the directional orientation of the data capture machine 118.

Additionally, the data capture machine 118 may include a spectral power distribution (SPD) detector 115, and/or any other measuring devices related to indoor spaces. According to embodiments, the SPD detector 115 may capture, at a set of locations within the physical space, a respective set of SPD values that may indicate the power (or strength) of each wavelength of light produced by a particular light source(s) including luminaire(s), windows, and skylights, at that location, and from which the luminance and chromaticity of a color may be derived. In some embodiments, the SPD detector 115 may be at least partially embodied as a video camera with one or more lenses capable of recording the visual representation of the physical space being measured.

Each of the image sensor(s) 110, the set of lasers 105, and/or the SPD detector 115 may transmit captured data to the computing device of the data capture machine 118, where the computing device may be configured to compile and/or analyze the data. In an implementation, the computing device may generate a reflected ceiling plan file from the set of image data captured and collected by the image sensor(s) 110, where the reflected ceiling plan file may indicate a set of locations of a set of luminaires located within the physical space. Additionally, the computing device may generate a floorplan of the physical space using the point cloud data captured and collected by the set of lasers and/or sonar devices 105.

Figure 2A:
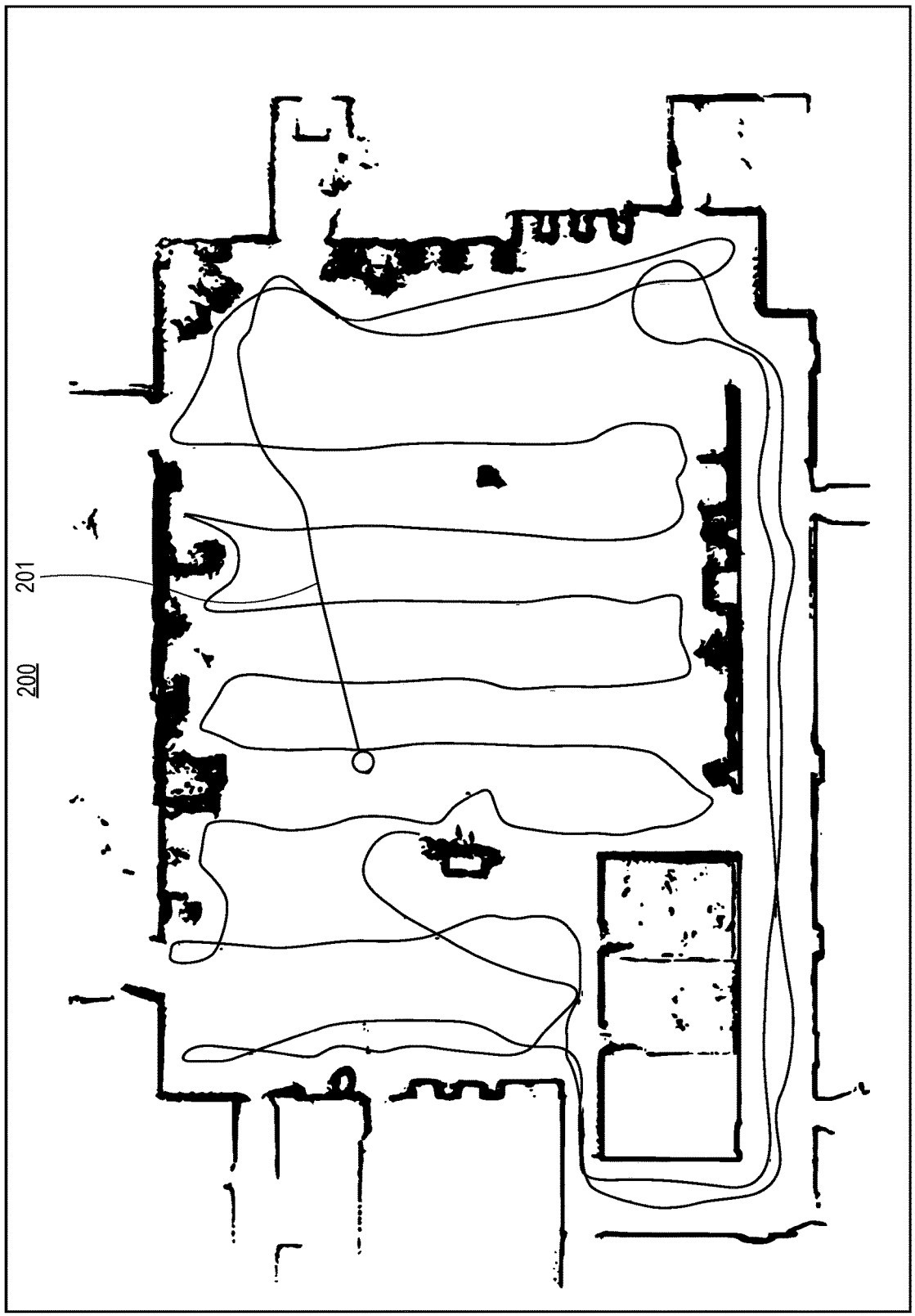
FIGS. 2A-2C are example renderings or depictions of a physical area(s), in accordance with some embodiments.

FIG. 2A illustrates an exemplary floorplan 200 of an example physical space. The floorplan 200 includes a path 201 that the data capture machine 118 traversed when capturing the data. It should be appreciated that the computing device may generate the floorplan 200 from the point cloud data captured and collected by the set of lasers and/or sonar devices 105, and/or from other data.

Figure 2B:
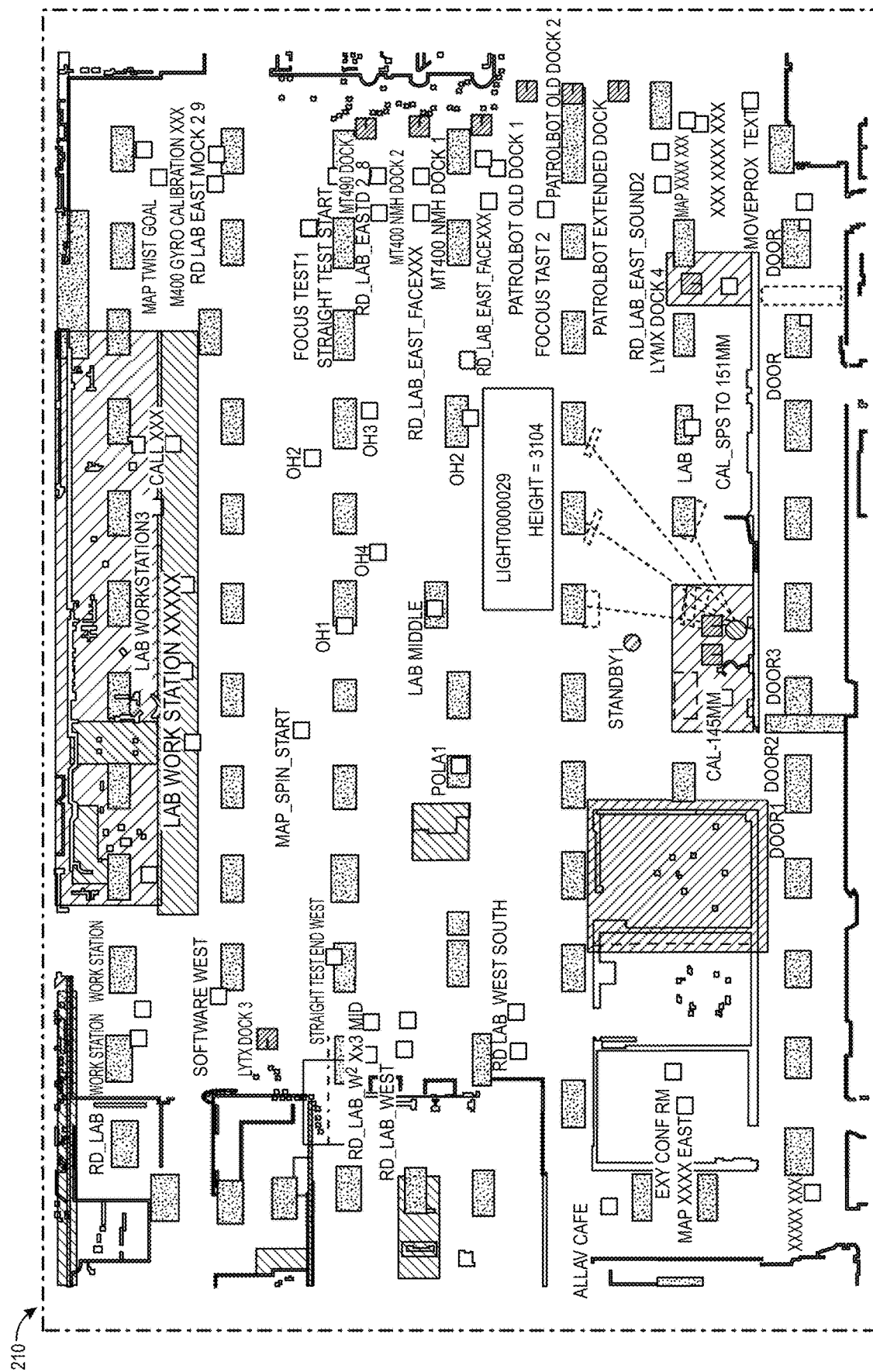

Additionally, FIG. 2B illustrates an exemplary reflected ceiling plan 210 of the example physical space. The reflected ceiling plan 200 indicates locations of various luminaires within the example physical space. It should be appreciated that the computing device may generate the reflected ceiling plan 210 from the set of image data captured and collected by the image sensor(s) 110, and/or from other data, such as the point cloud, and data resulting from algorithms that detect the shapes and reflectances of the luminaires.

Further, the computing device may create an SPD database that indicates the set of SPD values captured by the SPD detector 115 at a respective set of locations of the physical space. Additionally, the data capture machine 118 may have one or more additional components to detect where in the physical space the data capture machine 118 is located, along with the orientation of the data capture machine 118 when it captured the measurement (e.g., north, south, east, west, northwest, etc.), and record this data to a file. Moreover, the computing device may generate an electronic file that may have a format that may be readable and modified by a certain design application (e.g., a computer-aided design (CAD) application), for example those used by lighting specifiers to design and evaluate their designs.

In embodiments, the computing device may transmit the data (e.g., the reflected ceiling plan, the floorplan, the SPD database, the video file, and/or the electronic file) to a set of electronic devices 122, 123, 124 via a set of networks 111. Each of the electronic devices 122, 123, 124 may be any type of electronic device such as a mobile device (e.g., a smartphone), desktop computer, notebook computer, tablet, phablet, cloud computer, GPS (Global Positioning System) or GPS-enabled device, smart watch, smart glasses, smart bracelet, wearable electronic, PDA (personal digital assistant), pager, virtual reality (VR) headset, computing device configured for wireless communication, and/or the like. In embodiments, any of the electronic devices 122, 123, 124 may be an electronic device associated with an entity such as a company, business, corporation, or the like (e.g., a server computer or machine). In an implementation, a storage device (e.g., a "thumb drive") may interface with the computing device of the data capture machine 118 to access and store the captured and/or generated data, where the electronic devices 122, 123, 124 may read the captured and/or generated data stored on the storage device.

Each of the electronic devices 122, 123, 124 may support a design application that may read, process, and analyze data received from the computing device of the data capture machine 118. In embodiments, a user(s) may operate the electronic devices 122, 123, 124 to review various portions of the received data. In particular, a user interface(s) of the electronic devices 122, 123, 124 may present a visual rendering of the physical space that indicates various portions of the reflected ceiling plan, the floorplan, the SPD values, and the video capture(s). The user(s) may select to add, remove, and modify a luminaire or otherwise a light source to the floorplan, where the electronic devices 122, 123, 124 may update the visual rendering to reflect the added, removed, or modified luminaire. Thus, the user may review the presented information to assess deficiencies associated with and determine how to improve the non-visual circadian-effective lighting within the physical space.

Figure 2C:
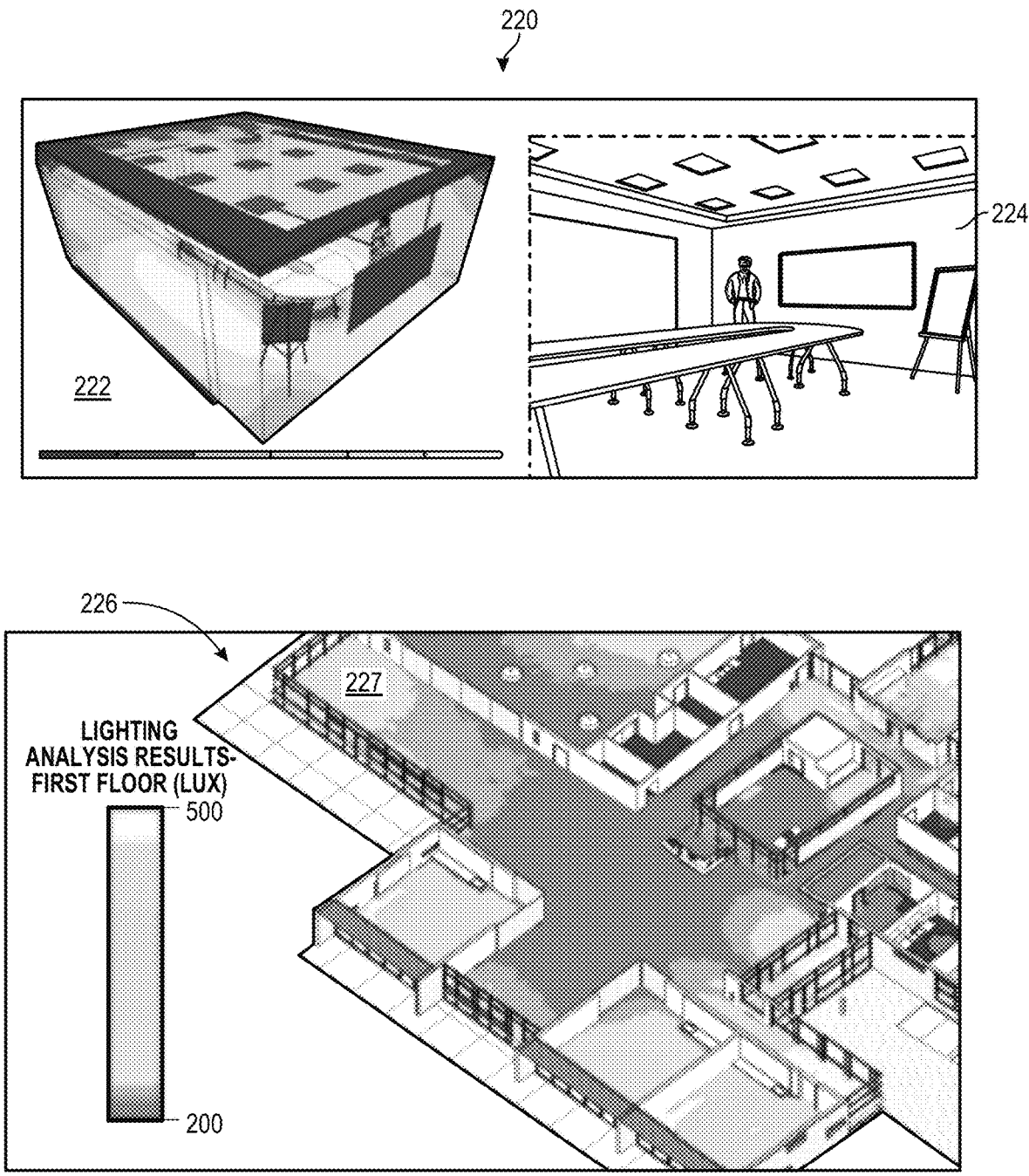

FIG. 2C is an exemplary heat map 220 and other visual depictions associated with enabling a user to assess deficiencies associated with and determine how to improve the non-visual circadian-effective lighting within the physical space. In particular, an example rendering 222 depicts an office along with locations of luminaires and a heat map of circadian stimulus produced by the luminaires. An additional example rendering 224 is a perspective view of the interior of the office, along with the luminaires, to depict a "real world" view of the lighting conditions within the office.

FIG. 2C further includes an example representation 226 of an additional interior environment. In particular, the representation 226 illustrates a perspective of a floor of the interior environment, where the representation 226 includes shading corresponding to levels of circadian stimulus at various locations and areas of the floor. Accordingly, a user may ascertain which areas of the floor lack ample light (e.g., location 227), and modify a corresponding lighting plan that allows additional light to reach these areas. Similarly, the user may ascertain which areas of the floor have too much light, and modifying the corresponding lighting plan to remove corresponding light.

The electronic devices 122, 123, 124 may additionally communicate with a server 126 via one or more networks 113. In embodiments, each of the network(s) 111, 113 may support any type of data communication via any standard or technology (e.g., GSM, CDMA, VoIP, TDMA, WCDMA, LTE, EDGE, OFDM, GPRS, EV-DO, UWB, Internet, IEEE 802 including Ethernet, WiMAX, Wi-Fi, Bluetooth, and others). The server 126 may be associated with an entity such as a company, business, corporation, or the like, and may interface with or support a memory or storage 127 capable of storing various data, such as in one or more databases or other forms of storage.

According to embodiments, the electronic devices 122, 123, 124 may retrieve certain data from the server 126 in association with executing the design application. For example, the electronic devices 122, 123, 124 may retrieve information associated with a certain luminaire that a user may want to add to the circadian calculations and visual rendering of the physical space. In some embodiments, the server 126 may support the design application (e.g., as a software as a service (SaaS) CAD implementation) and may enable a user to operate the design application to facilitate the functionalities as discussed herein.

Although depicted as a single server 126 in FIG. 1, it should be appreciated that the server 126 may be in the form of a distributed cluster of computers, servers, machines, or the like. In this implementation, the entity may utilize the distributed server(s) 126 as part of an on-demand cloud computing platform. Accordingly, when the electronic devices 122, 123, 124 interface with the server 126, the electronic devices 122, 124, 124 may actually interface with one or more of a number of distributed computers, servers, machines, or the like, to facilitate the described functionalities. Similarly, although three (3) electronic devices 122, 123, 124 are depicted in FIG. 1, it should be appreciated that greater or fewer amounts are envisioned. FIG. 2 depicts more specific components associated with the systems and methods. It should be appreciated that components of the data capture machine 118 may also directly communicate with the server 126 via one or more of the networks 111, 113.

Figure 3:
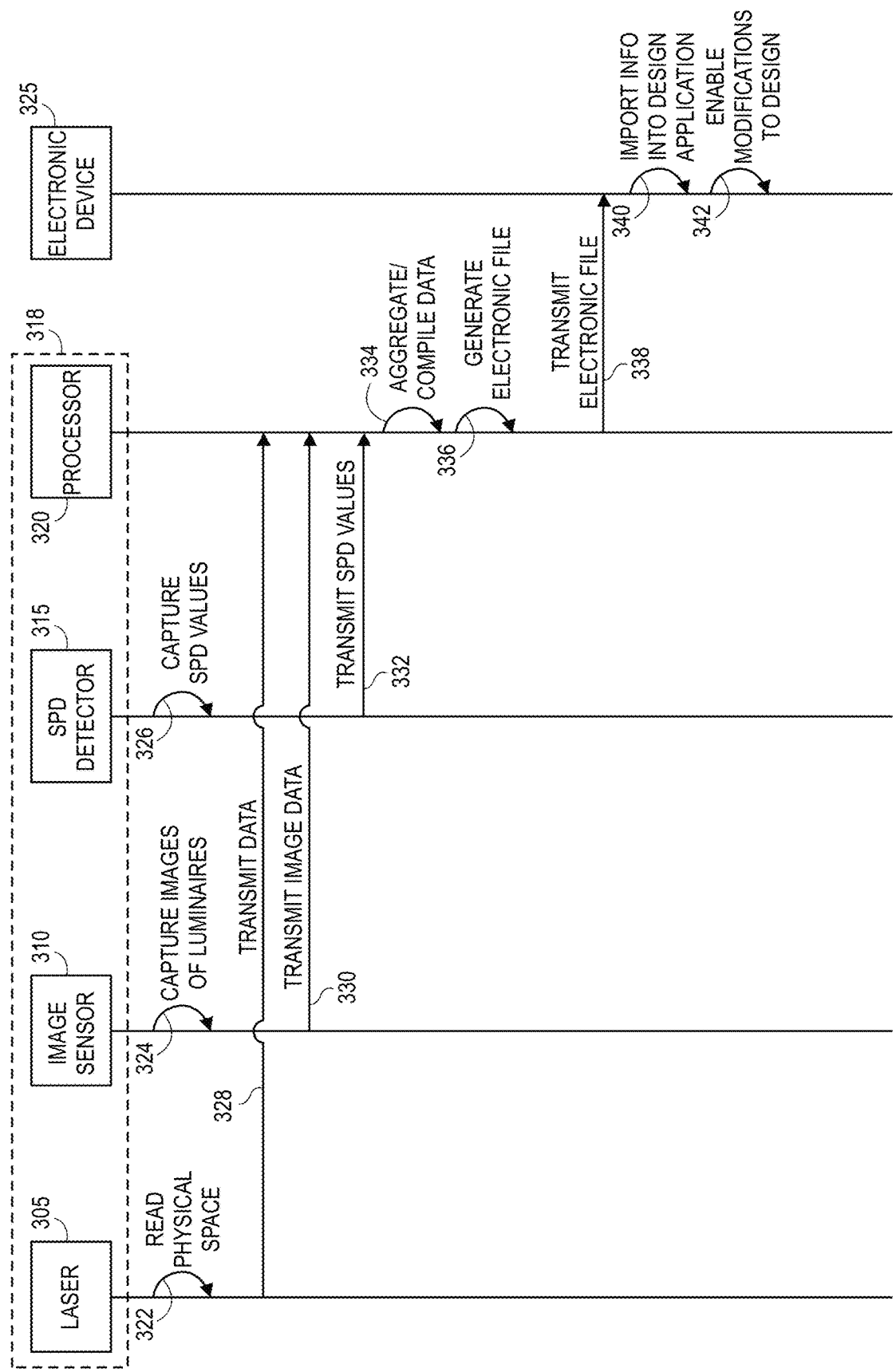
FIG. 3 is an example signal diagram depicting the components and entities and functionalities thereof, in accordance with some embodiments.

FIG. 3 illustrates a signal diagram 300 comprising a set of components and illustrating various functionalities that may be facilitated by the set of components. The signal diagram 300 includes a laser 305 (such as the laser(s) 105 as discussed with respect to FIG. 1, and which may be equipped with sonar capabilities), an image sensor 310 (such as the image sensor(s) 110 as discussed with respect to FIG. 1), an SPD detector 315 (or any recording device associated with the gathering of illumination data such as the SPD detector 115 as discussed with respect to FIG. 1) that may include a video camera, a processor 320, and an electronic device 325 (such as one of the electronic devices 122, 123, 124 as discussed with respect to FIG. 1).

Any combination of the laser 305, the image sensor 310, the SPD detector 315 (with or without the video camera), and the processor 320 may be a component(s) of a data capture machine 318 (such as the data capture machine 118 as discussed with respect to FIG. 1) that may be autonomous or controllable/operable by an individual. It should be appreciated that the electronic device 325 may be separate from, or integrated within, the data capture machine 318 and components thereof, the processor 320 may alternatively be a component of the electronic device 325.

The data capture machine 318 and any components thereof may be positioned or otherwise located within a physical space. Each of the laser 305, image sensor 310, and SPD detector 315 may communicate with the processor 320 via a communication bus or via another wired or wireless connection. According to embodiments, the SPD detector 315 may be a spectrophotometer or another type of detector. The electronic device 325 may be any type of electronic device that may interface with the processor 320, and may be equipped with a user interface comprising a display device and a set of input/output components to facilitate interactions and selections by a user.

As depicted in FIG. 3, the laser and/or sonar 305 may read or detect (322) and record information associated with the physical space. In particular, the laser and/or sonar 305 may detect objects located or disposed within the physical space and in proximity to the data capture machine 318. The data captured by the laser 305 may indicate the physical objects and locations of the physical objects relative to the data capture machine 318. In an implementation, the laser 305 may be supplemented or replaced by one or more sonar sensors to detect the objects. The laser 305 (or the one or more sonar sensors) may transmit (328) the detected information to the processor 320.

The image sensor 310 may capture (324) a set of images that may depict one or more light sources (e.g., luminaires, windows, skylights, and/or the like) located within the physical space. In embodiments, the set of images may depict a set of additional or alternative light sources, such as windows, skylights, and/or the like. In an implementation, the image sensor 310 may be orientated in an upward direction, where the one or more luminaires may be located above the image sensor 310 (e.g., the luminaires may be overhead lighting fixtures). The image sensor 310 may transmit (330) the image data to the processor 320.

The SPD detector 315 may capture (326) spectral power distribution (SPD) values associated with the physical space. The SPD values may indicate the power (or strength) of each wavelength of light produced by a particular light source(s) or luminaire(s), and from which the luminance and chromaticity of a color may be derived. Furthermore, additional information regarding the light source may be detected, such as the manufacturer of the luminaire, the model number, the remaining longevity of the light source, and/or other information. The SPD detector 315 may transmit (332) the SPD values to the processor 320. Additionally, the video capture device of the SPD detector 315 may continuously capture images of the physical space. Thus, in embodiments in which the recording device contains multiple camera angles, any post-processing software may enable a user to rotate the image in 360° field of view.

After receiving some or all of the data from the laser 305, the image sensor 310, and the SPD detector 315, the processor 320 may aggregate and compile (334) the data. Generally, the data transmitted from the laser 305, the image sensor 310, and the SPD detector 315 may include location data (e.g., GPS coordinates) indicating a location within the physical space at which the respective data was collected or captured. Accordingly, for each location at which any type of data was captured, the processor 320 may determine or identify any detected objects within the physical space as indicated in the data from the laser 305, any luminaires as depicted in the image data from the image sensor 310, and/or any SPD values as indicated in the data from the SPD detector 315.

Using the aggregated and compiled data, the processor 320 may generate (336) an electronic file associated with the physical space. In particular, the processor 320 may initially generate a floorplan of the physical space using at least the data from the laser 305. Additionally, the processor 320 may add, to the floorplan, a set of indications of a set of luminaires as indicated in the image data from the image sensor 310, to generate a reflected ceiling plan. Further, the processor 320 may add, to the reflected ceiling plan, the SPD values as indicated in the data from the SPD detector 315. Moreover, the processor 320 may add images to any or all of the visual images of the space, thus enabling rotation in 360°.

Accordingly, the electronic file may include relevant floorplan information, luminaire identifications and locations, SPD values at certain locations, and video images. The processor 320 may then process these data sets using various mathematical formulas to generate new data depicting the illumination of the physical space that penetrates the vertical plane of an occupant's eyes. If the data at a particular location and spatial orientation meets or exceeds a given circadian stimulus goal, a color may be rendered (e.g., green or blue) to illustrate a positive outcome. If the data fails to meet the given circadian stimulus goal, a color may be rendered (e.g., red or orange) to illustrate a negative outcome. Additionally, the electronic file may have a format that may be compatible with and readable by a certain design application (e.g., a computer-aided design (CAD) application), or may otherwise comply with a standard, where the electronic file may indicate a portion or all of the data or information aggregated, compiled, and/or generated with respect to (334) and (336).

The processor 320 may transmit (338) the electronic file to the electronic device 325 (or the electronic device 325 may access the electronic file from the data capture machine 318), and the electronic device 325 may import (340) the electronic file and related information into the design application. In particular, the electronic device 325 may initiate the design application and display, via a user interface, a rendering that depicts certain information included in the electronic file (e.g., the floorplan, the identifications and locations of the luminaires, the SPD values, and/or the video images). This information may be further manipulated using calculations in order to determine, for example, the resulting circadian stimulus (CS) of the physical space. Generally, the design application may display a virtual representation of the physical space, including a heat map or other visualization indicating the SPD values (or illuminance information that may be derived at least partially from the SPD values including the CS) within the virtual representation, a set of indications of the set of luminaires, and/or other information.

Initially, the design application may enable a user to specify a circadian stimulus (CS) design criteria, for certain contexts (e.g., CS>=0.30 during the day, CS⇐0.20 during the evening, and CS⇐0.10 at night). Generally, each luminaire as visually represented may have a set of illumination characteristics which may include brightness, color temperature, power output, SPD data, and a luminous intensity distribution characterized by a vertical-to-horizontal illuminance ratio ($E_V E_H$). The design application may calculate a set of photopic illuminance values that the lighting system in the physical space would provide in the expected plane of an occupants' eyes (E(v)) (e.g., between 0.9 and 1.3 m above the floor plane and extending throughout the physical space). Additionally, the design application may, calculate the average CS from the SPD(s) and E(v)(s) associated with the luminaires, and compare the calculated CS(s) with the CS(s) as specified in the design criteria, and determine whether one or more modifications may be needed or desired. Additionally or alternatively, the design application may calculate the average CS from the information provided by the data capture machine 318.

Accordingly, the electronic device 325 may enable (342) one or more modifications to the design. Generally, a gap(s) between a desired goal(s) (e.g., a CS of 0.3) and measured values may be determined, where the electronic device 325 may illustrate the gap(s) in the visualization. A user such as a lighting designer may review the visualization and assess how to reduce or close the gap(s) (e.g., by adding specific luminaires) and achieve a circadian-effective physical space, and thus improve the health and well-being of the occupants of the physical space. In an implementation, the design application may automatically detect gaps and recommend modifications to the lighting to reduce or close the gaps. In another implementation, the design application may recommend modifications to the lighting through a selection and recommended placement and specification of a set of additional luminaires or lamps to reduce or close any gap.

In some instances, a user of the electronic device 325 may select to locate a virtual luminaire at a virtual location of the virtual representation, where the virtual luminaire has a set of illumination characteristics (e.g., brightness, color temperature, power output, E(v)/E(h), SPD values). It should be appreciated that the virtual luminaire may be any type of luminaire located at any location of the physical space (e.g., ceiling, wall, etc.). The design application may update the virtual representation (e.g., the displayed heat map or visualization) to include, at the virtual location, the virtual luminaire having the set of illumination characteristics. The user may also select to adjust the set of illumination characteristics, where the design application may automatically update the virtual representation to reflect the adjusted set of illumination characteristics. Accordingly, the user may review the virtual representation to assess how the addition of a luminaire may affect the lighting characteristics for that portion of the physical space. Additionally, the design application may determine whether the addition of or modification to a luminaire(s) results in a desired CS goal being achieved.

In some embodiments, the visual representation of a physical space as collected by the components of the data capture machine 318 may be compared with respective values associated with a design of the physical space. Any differences as determined from the comparison may be used by a company to increase the accuracy of designing and simulating lighting associated with designing physical spaces.

In some embodiments, the visual representation of a physical space as collected by the components of the data capture machine 318 and as imported into a design application (e.g., a CAD application) may enable a user to "enter" the virtual space using a virtual reality (VR) or augmented reality (AR) goggle/headset. The view of the virtual space may be further enhanced with data drawn from the calculations in order to depict the contribution to the CS measure achieved by each illumination component in the scene, including the luminaire/lamp, window, and/or skylight, and the impact of the reflection off of a reflected surface.

Various functionalities associated with interacting with the visual representation are envisioned. In particular, a user may alter the depiction of the physical space and relative heat map to create a "first person" view of the data, as if the user was in the actual space. Additionally, the user may visualize the associated contribution of a luminaire/lamp, window, and/or skylight through the visual representation displaying the underlying data, either as numbers, colors, and/or graphics, relative to a given light source(s). Further, a user may visualize the associated contribution of adding a luminaire/lamp, window, and/or skylight through the visual representation displaying the underlying data, either as numbers, colors, and/or graphics, relative to a given light source(s).

Figure 4:
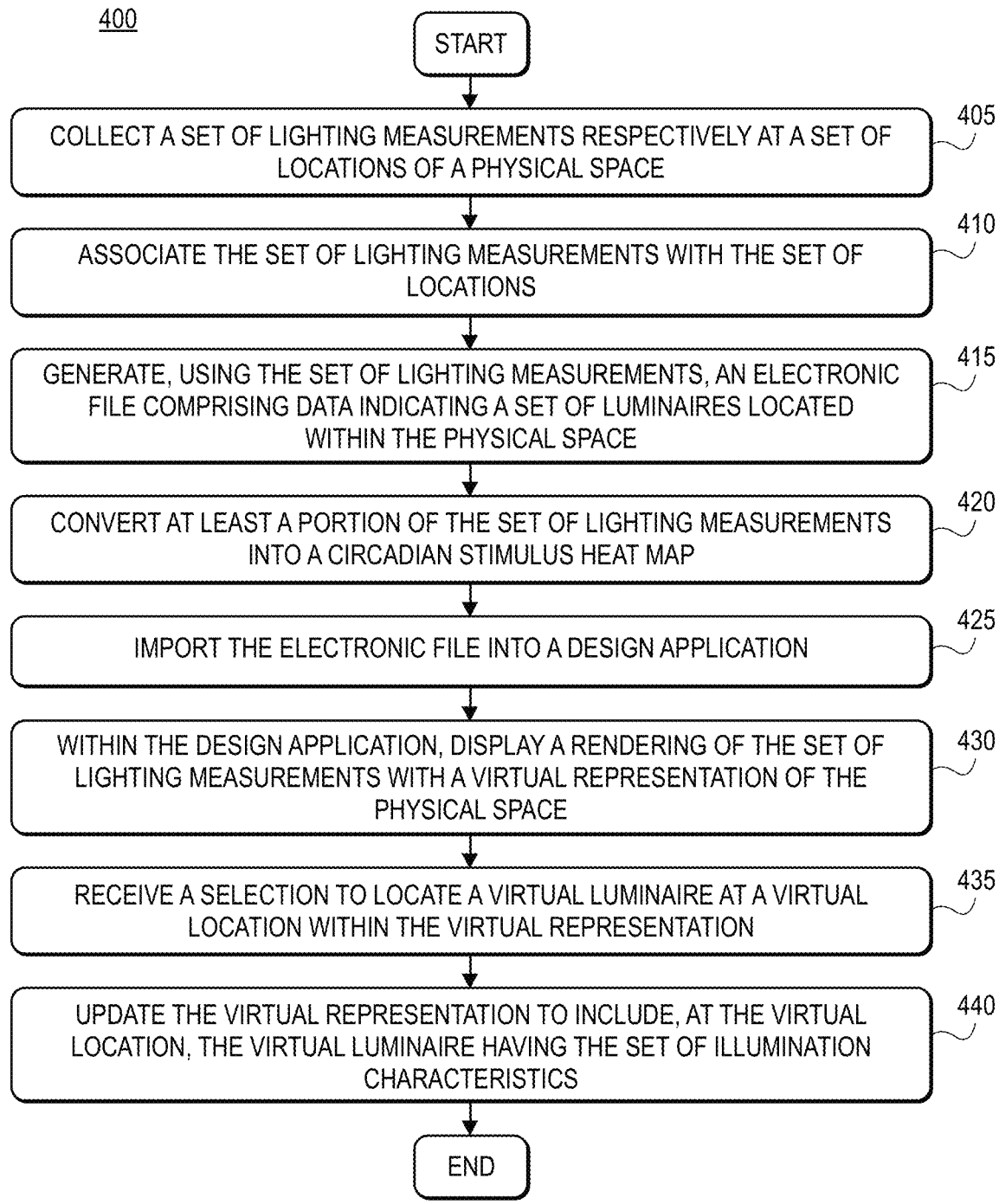
FIG. 4 is an example flowchart of a method for detecting lighting conditions within a physical space, in accordance with some embodiments.

FIG. 4 is a flowchart of a method for detecting lighting conditions within a physical space. The method 400 may be executed or implemented by one or more electronic devices and components thereof. The method 400 begins when a data capture machine collects (block 405) a set of lighting measurements respectively at a set of locations of a physical space. In embodiments, a detector of the data capture machine may collect a set of spectral power distribution measurements respectively at the set of locations.

In some instances, the electronic device may apply a set of calculations that convert the SPD measurements into CS measurements at the set of locations, where the SPD measurements may indicate a set of reflections off a set of components disposed within the physical space. Further, in embodiments, the electronic device may convert the SPD measurements into melanopsin lux (ML) measurements corresponding to the set of locations. The electronic device may associate (block 410) the set of lighting measurements with the set of locations at which the set of lighting measurements was collected.

The electronic device may generate (block 415), using the set of lighting measurements, an electronic file comprising data indicating a set of luminaires located within the physical space. According to embodiments, a laser of the data capture machine may capture a set of readings associated with the physical space, generate, using the set of readings, a representation of a floorplan of the physical space, and convert the set of readings into vector maps with geo-positioning capabilities. Accordingly, in generating the electronic file, the electronic device may generate a reflected ceiling plan overlaid on the floorplan of the physical space. Additionally or alternatively, an image sensor of the data capture machine may capture a set of digital images that depict the set of luminaires and the electronic device may generate the electronic file using the set of digital images and the set of lighting measurements associated with the set of locations.

The electronic device may convert (block 420) at least a portion of the set of lighting measurements into a circadian stimulus heat map, where the circadian stimulus heat map may indicate a goal attainment and depict a set of colors according to the goal attainment. The electronic device may import (block 425) the electronic file into a design application. Further, within the design application and via a user interface, the electronic device may display (block 430) a rendering of the set of lighting measurements within a virtual representation of the physical space, where the rendering of the set of lighting measurements may be displayed as a heat map indicating the set of lighting measurements within the virtual representation of the physical space. Additionally or alternatively, the electronic device may display, within the virtual representation, a set of indications corresponding to the set of luminaires, and/or may enable a user to set various colors corresponding to differing levels for achieving a lighting/luminance goal(s).

The electronic device may receive (block 435), via a user interface, a selection to locate a virtual luminaire at a virtual location within the virtual representation of the physical space, where the virtual luminaire may have a set of illumination characteristics. In embodiments, the electronic device may enable the user to modify various aspects of the physical space, such as by relocating, changing, removing, and/or adding a luminaire(s). Additionally, the electronic device may update (block 440) the virtual representation to include, at the virtual location, the virtual luminaire having the set of illumination characteristics. Further, the electronic device may update the virtual representation to represent the updated illumination characteristics of the physical space.

In some embodiments, the electronic device may receive, via the user interface, a selection to adjust the set of illumination characteristics of the virtual luminaire. Additionally, the electronic device may update the virtual representation to reflect the selection to adjust the set of illumination characteristics of the virtual luminaire, which may involve updating the virtual representation to reflect (i) an impact on a circadian stimulus (SC), and (ii) an impact on an melanopsin lux (ML).

Figure 5:
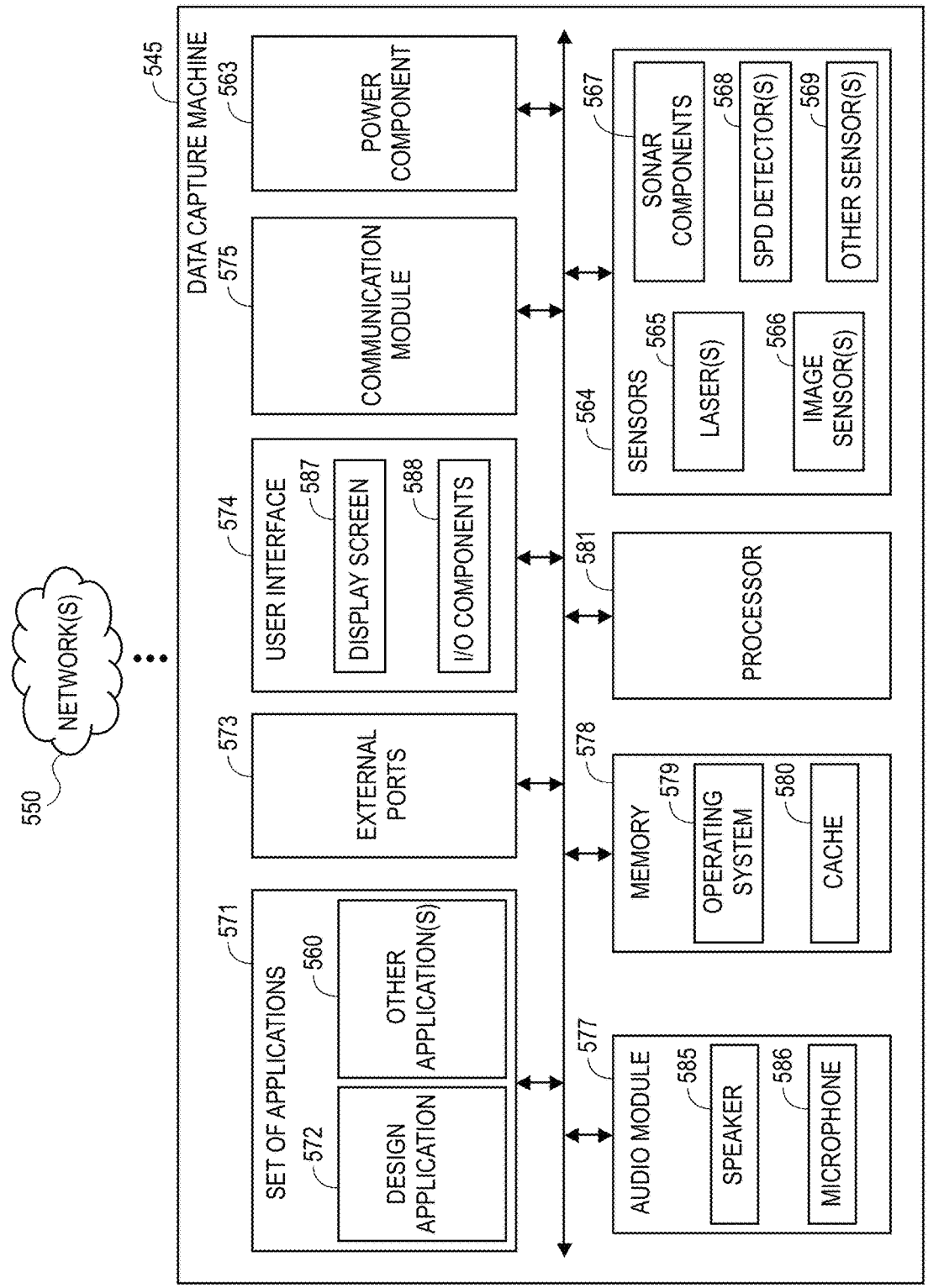
FIG. 5 is a block diagram of a data capture machine, in accordance with some embodiments.

FIG. 5 illustrates an example data capture machine 545 in which the functionalities as discussed herein may be implemented. According to embodiments, the data capture machine 545 may be embodied as the data capture machine 118 as discussed with respect to FIG. 1. In an implementation, the components of the data capture machine 545 may be integrated into a single physical device or machine, or may be distributed between or among multiple physical devices or machines. For example, a first device may integrate certain sensors, and a second device may integrate a set of applications and a user interface.

The data capture machine 545 may include a processor 581 or other similar type of controller module or microcontroller, as well as a memory 578. The data capture machine 545 may further include a power component 563 (e.g., an A/C power component) or other type of power source (e.g., one or more batteries) configured to supply or provide power to the data capture machine 545 and components thereof.

The memory 578 may store an operating system 579 capable of facilitating the functionalities as discussed herein as well as a cache 580 configured to store/cache various sensor data and/or other data. The processor 581 may interface with the memory 578 to execute the operating system 579 and retrieve data from the cache 580, as well as execute a set of applications 571 such as a design application 572 (which the memory 578 can also store). For example, the design application 572 may render depictions of physical spaces based on collected sensor data. The memory 578 can include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The data capture machine 545 may further include a communication module 575 configured to interface with the one or more external ports 573 to communicate data via one or more networks 550. According to some embodiments, the communication module 575 may include one or more transceivers functioning in accordance with IEEE standards, 3GPP standards, or other standards, and configured to receive and transmit data via the one or more external ports 573. More particularly, the communication module 575 may include one or more WWAN transceivers configured to communicate with a wide area network including one or more cell sites or base stations to communicatively connect the data capture machine 545 to additional devices or components. Further, the communication module 575 may include one or more WLAN and/or WPAN transceivers configured to connect the data capture machine 545 to local area networks and/or personal area networks, such as a Bluetooth® network.

The data capture machine 545 may further include a set of sensors 564. In particular, the set of sensors 564 may include one or more lasers 565, one or more image sensors 566, one or more sonar components 567, one or more SPD detectors 568, and/or one or more other sensors 569 (e.g., accelerometers, touch sensors, NFC components, etc.). The data capture machine 545 may include an audio module 577 including hardware components such as a speaker 585 for outputting audio and a microphone 586 for detecting or receiving audio. The data capture machine 545 may further include a user interface 574 to present information to the user and/or receive inputs from the user. As shown in FIG.

5, the user interface 574 includes a display screen 587 and I/O components 588 (e.g., capacitive or resistive touch-sensitive input panels, keys, buttons, lights, LEDs, cursor control devices, haptic devices, and others). The user interface 574 may also include the speaker 585 and the microphone 586. In embodiments, the display screen 587 is a touchscreen display using singular or combinations of display technologies and may include, a thin, transparent touch sensor component superimposed upon a display section that is viewable by a user. For example, such displays include capacitive displays, resistive displays, surface acoustic wave (SAW) displays, optical imaging displays, and the like.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 581 (e.g., working in connection with the operating system 579) to facilitate the functions as described herein. In this regard, the program code may be implemented in any desired language, and may be implemented as machine code, assembly code, byte code, interpretable source code or the like (e.g., via C. C++, Java, Actionscript, Objective-C, Javascript, CSS, XML, and/or others).

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A computer-implemented method for detecting lighting conditions within a physical space, the method comprising:
   detecting, by a scanning device of a data capture machine, a set of readings indicating a presence of a set of physical objects located at a set of locations within the physical space;
   capturing, by an image sensor of the data capture machine, a set of images depicting a set of luminaires located at the set of locations within the physical space;
   capturing, by a recording device of the data capture machine, a set of lighting measurements respectively at the set of locations within the physical space;
   aggregating, by a processor, the set of readings, the set of images, and the set of lighting measurements by associating the set of readings, the set of images, and the set of lighting measurements with the set of locations at which the set of readings, the set of images, and the set of lighting measurements were detected or captured; and
   generating, by the processor using the set of readings, the set of images, and the set of lighting measurements that were aggregated, an electronic file, including:
      generating a floorplan of the physical space using the set of readings that were captured,
      adding, to the floorplan, a set of indications corresponding to the set of luminaires as depicted in the set of images, to generate a reflected ceiling plan,
      adding, to the reflected ceiling plan, the set of lighting measurements, wherein the set of lighting measurements comprises spectral power distribution (SPD) measurements, and applying a set of calculations that convert the SPD measurements into circadian stimulus (CS) measurements at the set of locations.

2. The computer-implemented method of claim 1, wherein capturing the set of lighting measurements comprises:
   capturing, by the recording device of the data capture machine, a set of SPD measurements respectively at the set of locations.

3. The computer-implemented method of claim 1, wherein the SPD measurements indicate a set of reflections off a set of components disposed within the physical space.

4. The computer-implemented method of claim 1, further comprising:
   converting the SPD measurements into melanopsin lux (ML) measurements corresponding to the set of locations.

5. The computer-implemented method of claim 1, further comprising:
   converting at least a portion of the set of lighting measurements into a circadian stimulus heat map indicating a goal attainment and depicting a set of colors according to the goal attainment.

6. The computer-implemented method of claim 1, further comprising:
   importing the electronic file into a design application; and
   within the design application via a user interface, displaying a rendering of the set of lighting measurements within a virtual representation of the physical space.

7. The computer-implemented method of claim 6, wherein displaying the rendering of the set of lighting measurements comprises:
   displaying a heat map indicating the set of lighting measurements within the virtual representation of the physical space.

8. The computer-implemented method of claim 6, further comprising:
   receiving, via the user interface, a selection to locate a virtual luminaire at a virtual location within the virtual representation of the physical space, the virtual luminaire having a set of illumination characteristics; and
   updating the virtual representation to include, at the virtual location, the virtual luminaire having the set of illumination characteristics.

9. The computer-implemented method of claim 8, further comprising:

receiving, via the user interface, a selection to adjust the set of illumination characteristics of the virtual luminaire; and updating the virtual representation to reflect the selection to adjust the set of illumination characteristics of the virtual luminaire.

10. The computer-implemented method of claim 9, wherein updating the virtual representation comprises:

updating the virtual representation to reflect (i) an impact on a circadian stimulus (SC), and (ii) an impact on a melanopsin lux (ML).

11. The computer-implemented method of claim 6, further comprising:

displaying, within the virtual representation, the set of indications corresponding to the set of luminaires.

12. The computer-implemented method of claim 1, further comprising:

converting the set of readings captured by the scanning device into vector maps with geo-positioning capabilities.

13. A device for detecting lighting conditions within a physical space, comprising:

at least one image sensor configured to capture a set of digital images depicting a set of luminaires located at a set of locations within the physical space;

at least one laser configured to capture a set of readings indicating a presence of a set of physical objects located at the set of locations within the physical space;

a detector configured to collect a set of spectral power distribution (SPD) measurements respectively at the set of locations of the physical space; and a processor interfacing with the at least one image sensor, the at least one laser, and the detector, and configured to:

aggregate the set of readings, the set of digital images, and the set of SPD measurements by associating the set of readings, the set of digital images, and the set of SPD measurements with the set of locations at which the set of readings, the set of digital images, and the set of SPD measurements were captured or collected, and generate, using the set of readings, the set of digital images, and the set of SPD measurements that were aggregated, an electronic file, including:

generate, using the set of readings captured by the at least one laser, a floorplan of the physical space, add, to the floorplan, a set of indications corresponding to the set of luminaires as depicted in the set of digital images, to generate a reflected ceiling plan add, to the reflected ceiling plan, the set of SPD measurements, and apply a set of calculations that convert the set of SPD measurements into circadian stimulus (CS) measurements at the set of locations.

14. The device of claim 13, wherein the processor is further configured to:

convert at least a portion of the set of SPD measurements into a circadian stimulus heat map indicating a goal attainment and depicting a set of colors according to the goal attainment.

15. The device of claim 13, wherein the processor is further configured to:

import the electronic file into a design application, and within the design application via a user interface, display a rendering of the set of SPD measurements within a virtual representation of the physical space.

16. The device of claim 15, wherein the processor is further configured to:

receive, via the user interface, a selection to locate a virtual luminaire at a virtual location within the virtual representation of the physical space, the virtual luminaire having a set of illumination characteristics, and update the virtual representation to include, at the virtual location, the virtual luminaire having the set of illumination characteristics.

\* \* \* \* \*